US010270285B2

(12) United States Patent
Mandarino et al.

(10) Patent No.: US 10,270,285 B2
(45) Date of Patent: Apr. 23, 2019

(54) MULTI-UPS SYSTEMS WITH COORDINATED FAULT RESPONSE AND POWER SHARING USING PARALLELING BUS

(71) Applicant: Eaton Corporation, Cleveland, OH (US)

(72) Inventors: Angelo Louis Mandarino, Louisburg, NC (US); Miguel Eduardo Chavez, Raleigh, NC (US)

(73) Assignee: Eaton Intelligent Power Limited (IE)

( * ) Notice: Subject to any disclaimer, the term of this patent is extended or adjusted under 35 U.S.C. 154(b) by 429 days.

(21) Appl. No.: 14/814,688

(22) Filed: Jul. 31, 2015

(65) Prior Publication Data

US 2017/0033595 A1    Feb. 2, 2017

(51) Int. Cl.
*H02J 1/10* (2006.01)
*H02J 9/06* (2006.01)
*H02J 3/38* (2006.01)
*H02J 9/00* (2006.01)

(52) U.S. Cl.
CPC ............. *H02J 9/061* (2013.01); *H02J 3/38* (2013.01); *H02J 9/00* (2013.01); *H02J 9/062* (2013.01)

(58) Field of Classification Search
CPC .... H02J 9/061; H02J 9/062; H02J 3/38; H02J 9/00
USPC .......................................................... 307/23
See application file for complete search history.

(56) References Cited

U.S. PATENT DOCUMENTS

| 2006/0167569 | A1  | 7/2006  | Colombi et al. |
| 2006/0226706 | A1  | 10/2006 | Edelen et al. |
| 2013/0080793 | A1  | 3/2013  | Familiant et al. |
| 2014/0097680 | A1  | 4/2014  | Navarro |
| 2014/0375133 | A1* | 12/2014 | McCarthy ............... H02J 9/066 307/68 |

OTHER PUBLICATIONS

International Search Report and Written Opinion Corresponding to International Application No. PCT/US2016/044405; dated Oct. 11, 2016; 11 Pages.
Notification Concerning Transmittal of International Preliminary Report on Patentability Corresponding to International Application No. PCT/US2016/044405; dated Feb. 15, 2018; 7 Pages.

* cited by examiner

*Primary Examiner* — Richard Tan
(74) *Attorney, Agent, or Firm* — Stanek Lemon Crouse & Meeks

(57) ABSTRACT

Some embodiments of the inventive subject matter provide a system including a plurality of power supply units having AC inputs configured to be coupled to an AC power source and AC outputs coupled to respective first busses. Each of the power supply units includes an uninterruptible power supply (UPS) having an output configured to be coupled to the AC output of the power supply unit, a first switch configured to selectively couple the AC input to the AC output of the power supply unit, and a second switch configured to selectively couple the AC output of the power supply unit to a second bus. The system may further include at least one control circuit configured to control first and second ones of the power supply units to enable the first one of the power supply units to provide power to the first bus coupled to the second power supply unit from the first power supply unit via the second bus.

18 Claims, 7 Drawing Sheets

MULTI-UPS SYSTEMS WITH COORDINATED FAULT RESPONSE AND POWER SHARING USING PARALLELING BUS

BACKGROUND

The inventive subject matter relates to power supply apparatus and methods, more particularly, to uninterruptible power supply systems and methods of operating the same.

Uninterruptible power supply (UPS) systems are commonly used to provide power supply redundancy and quality in a variety of different applications, such as in data centers medical centers and industrial facilities. Typically, UPS systems may be used to provide power from a backup source (e.g., battery, flywheel, fuel cell, etc.) to maintain operation of equipment in the event of the failure of a primary utility power supply.

In some installations, respective UPSs may be used to provide uninterruptible power to respective groups of equipment. Such an arrangement typically involves sizing the respective UPSs based on the power requirements of the equipment that they serve. UPSs may also be used in output-paralleled arrangements in which multiple UPS may share a load and redundant arrangements in which multiple UPSs are configured to back up one another in the event of a UPS failure. Examples of UPS arrangements supporting redundancy and load sharing are described in U.S. Pat. No. 7,459,803 to Mosman and U.S. Pat. No. 8,850,237 to Familiant et al.

SUMMARY

Some embodiments of the inventive subject matter provide a system including a plurality of power supply units having AC inputs configured to be coupled to an AC power source and AC outputs coupled to respective first busses. Each of the power supply units includes an uninterruptible power supply (UPS) having an output configured to be coupled to the AC output of the power supply unit, a first switch configured to selectively couple the AC input to the AC output of the power supply unit, and a second switch configured to selectively couple the AC output of the power supply unit to a second bus. The system may further include at least one control circuit configured to control first and second ones of the power supply units to enable the first one of the power supply units to provide power to the first bus coupled to the second power supply unit from the first power supply unit via the second bus.

In some embodiments, the at least one control circuit may be configured to detect a fault condition on the first bus coupled to one of the power supply units and to responsively close the first switch of the one of the power supply units and open the second switch of the one of the power supply units to support clearance of the fault. In some embodiments, the at least one control circuit may be configured to detect a fault on the second bus and to responsively open all of the second switches of the power supply units. In further embodiments, the at least one control circuit may be configured to operate at least one of the power supply units in an energy saving mode wherein the first switches of the at least one of the plurality of power supply units is closed to bypass the UPS thereof. In still further embodiments, the at least one control circuit may be configured to operate a first one of the power supply units in a first mode wherein the first switch of the first one of the power supply units is closed to bypass the UPS thereof and thereby provide power from the AC source to the first bus served by the first one of the power supply units while concurrently operating a second one of the power supply units in a second mode wherein the first switch of the second one of the power supply units is open and the UPS of the second one of the power supply units provides power to the first bus served by the second one of the power supply units.

Further embodiments of the inventive subject matter provide a system including a plurality of power supply units having AC inputs coupled to an AC power source and AC outputs coupled to respective loads. Each of the power supply units includes an uninterruptible power supply (UPS) having an output configured to be coupled to the AC output of the power supply unit, a first static switch configured to selectively couple the AC input to the AC output of the power supply unit, and a second static switch configured to selectively couple the AC output of the power supply unit to a paralleling bus. The system further includes at least one control circuit configured to control the power supply units. The at least one control circuit may be configured to operate the first and second static switches of the power supply units to selectively transfer power between the power supply units and the loads via the paralleling bus.

In some embodiments, the at least one control circuit may be configured to control first and second ones of the power supply units to enable the first one of the power supply units to provide power to the load coupled to the second power supply unit from the first power supply unit via the paralleling bus. In further embodiments, the at least one control circuit may be configured to detect a fault condition for the load coupled to one of the power supply units and to responsively close the first static switch of the one of the power supply units and open the second static switch of the one of the power supply units to support clearance of the fault. In still further embodiments, the at least one control circuit may be configured to detect a fault on the paralleling bus and to responsively open all of the second static switches of the power supply units.

In some embodiments, the at least one control circuit may be configured to operate at least one of the power supply units in an energy saving mode wherein the first static switch of the at least one of the power supply units is closed to bypass the UPS thereof. The at least one control circuit may be configured to open the first static switch of the at least one of the power supply units and initiate provision of power from the UPS thereof in response to a condition of the AC power source. The at least one control circuit may be configured to operate a first one of the power supply units in a first mode wherein the first static switch of the first one of the power supply units is closed to bypass the UPS thereof and provide power to the load coupled to the first one of the power supply units from the AC power source while concurrently operating a second one of the power supply units in a second mode wherein the first static switch of the second one of the power supply units is open and the UPS of the second one of the power supply units is providing power to a load coupled to the load coupled to the second one of the power supply units.

Still further embodiments of the inventive subject matter provide a system including a first UPS having an output configured to be coupled to a first load, a second UPS having an output configured to be coupled to a second load, a first switch configured to selectively couple an AC power source to the first load to bypass the first UPS, a second switch configured to selectively couple the first load to a paralleling bus, a third switch configured to selectively couple the AC power source to the second load to bypass the second UPS, and a fourth switch configured to selectively couple the second load to the paralleling bus.

In some embodiments, the system may further include at least one control circuit configured to control the first, second, third and fourth switches to selectively transfer power to the first and second loads via the paralleling bus. In some embodiments, the system may further include at least one control circuit configured to control the first and second UPSs and the first, second, third and further switches to enable the first UPS to provide power to the second load via the paralleling bus. The at least one control circuit may be further configured to detect a fault condition for the first load and to responsively close the first switch and open the second switch to support clearance of the fault. The at least one control circuit may be configured to detect a fault on the paralleling bus and to responsively open the second and fourth switches. The at least one control circuit may be configured to maintain the first switch in a closed state to bypass the first UPS and provide power to the first load from the AC power source while concurrently maintaining the third switch in an open state to support provision of power to the second load from the second UPS.

DETAILED DESCRIPTION

Figure 1:
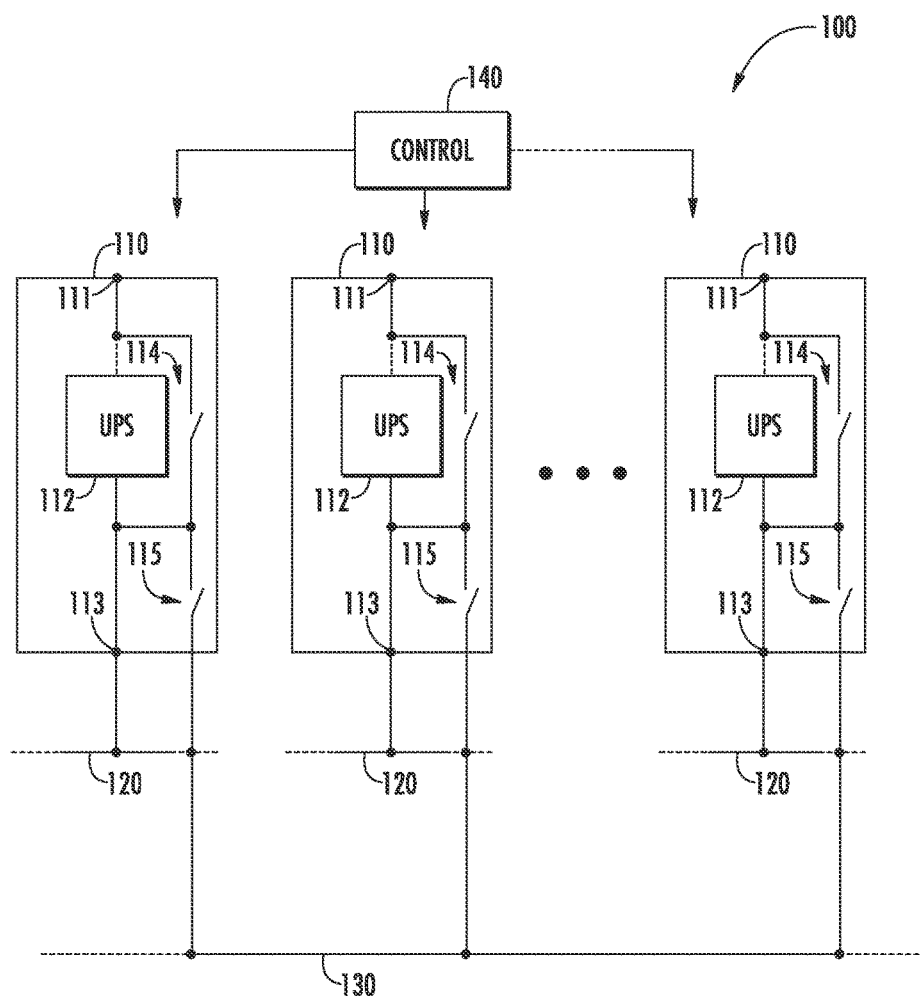
FIG. 1 is a schematic diagram illustrating a power supply system according to some embodiments of the inventive subject matter.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Some embodiments of the inventive subject matter may provide uninterruptible power supply (UPS) systems that incorporate switches that couple UPS to a paralleling bus that supports load sharing and other operational features. Such arrangements may allow excess capacity to be shared across multiple UPS containing units, thus providing system-wide redundancy when all UPS units are operating an online or energy saving modes. Such arrangements may also enable servicing of diverse loads with different levels of redundancy. The switching arrangement may also facilitate fault isolation and/or clearing.

FIG. 1 illustrates a power distribution system 100 according to some embodiments of the inventive subject matter. The system 100 includes a plurality of power supply units 110, each including an uninterruptible power supply (UPS) 112 and first and second switches 114, 115. Each of the power supply units 110 has at least one AC input 111 configured to be coupled to an AC power source and an AC output 113 configured to be coupled to a first bus 120. In some embodiments, the first busses 120 may be individual busses that serve individual loads for respective ones of the power supply units 110.

The first switch 114 in each of the power supply units 110 is configured to couple and decouple the AC input 111 to the AC output 113, such that the first switch 114 may be used to bypass the UPS 112 and supply power directly from the AC input 111 to the AC output 113. The second switch 115 in each of the power supply units 110 is configured to couple and decouple the AC output 113 to a second bus 130. Control circuitry 140 is configured to control the UPSs 112 and the switches 114, 115 to, for example, support power-sharing among the power supply units 110, multi-mode operations in which selected ones of the power supply units operate in different modes, and isolation and/or clearing of faults on the first and second busses 120, 130.

It will be appreciated that the power supply units 110 may be implemented in any of a variety of different ways. For example, the UPSs 112 may include one or more different types of UPSs including, for example, double conversion UPSs and standby UPSs. The UPSs 112 may generally include the same type of UPSs or may include two or more different types of UPSs. The UPSs 112 may have the same capacity or may include UPSs of different capacities. The first and second switches 114, 115 may include, for example, solid-state static switches (e.g., antiparallel connected SCRs) and/or other switching devices, such as transistors. The control circuitry 140 may generally include digital and/or analog circuitry, such as one or more processing devices (e.g., microcontrollers or microprocessors) and peripheral circuitry (e.g., drivers, signal processors, sensors, etc.) for interfacing such processing devices to components such as the UPSs 112 and the switches 114, 115. The control circuitry 140 may include respective control circuits within the power supply units 110 (e.g., in the UPSs 112) and/or control circuitry located external to the power supply units 110.

Figure 2:
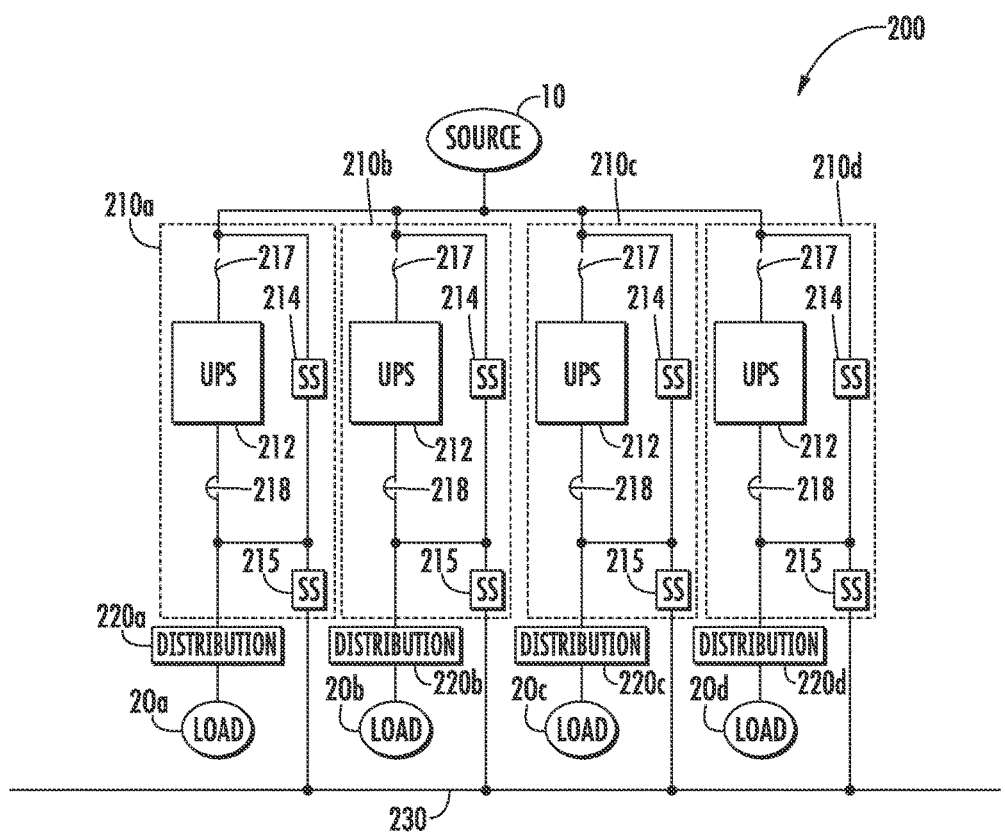
FIG. 2 is a schematic diagram illustrating a power supply system according to further embodiments.

FIG. 2 illustrates a power supply system 200 according to further embodiments of the inventive subject matter. The system 200 includes first, second, third, and fourth power supply units 210a, 210b, 210c, 210d having AC inputs coupled in common to an AC power source 10. The AC power source 10 may include, for example, a single utility source or switchgear (e.g., one or more transfer switches) configured to selectively couple two or more different power sources (e.g., utility sources and local generators) to the power supply units 210a, 210b, 210c, 210d. AC outputs of the power supply units 210a, 210b, 210c, 210d are coupled to respective distribution busses 220a, 220b, 220c, 220d that serve respective loads 20a, 20b, 20c, 20d. The distribution busses 220a, 220b, 220c, 220d may be coupled to the loads 20a, 20b, 20c, 20d by various types of conductors, such as cables, bus bars and the like, and/or different connectivity components, such as switchgear, circuit breakers, and the like.

Each of the power supply units 210a, 210b, 210c, 210d includes a UPS 212 and first and second switches, here shown as first and second static switches 214, 215. The first static switches 214 are configured to support bypassing of the UPSs 212 such that the AC inputs of the power supply units 210a, 210b, 210c, 210d may be directly coupled to their respective distribution busses 220a, 220b, 220c, 220d. The second static switches 215 are configured to couple the AC outputs of the power supply units 210a, 210b, 210c, 210d to a paralleling bus 230. As further shown, the power supply units 210a, 210b, 210c, 210d may further include third and fourth switches 217, 218 (e.g., contactors), which may be used to decouple the UPSs 212 from the AC inputs and AC outputs of the power supply units 210a, 210b, 210c, 210d.

Figure 3:
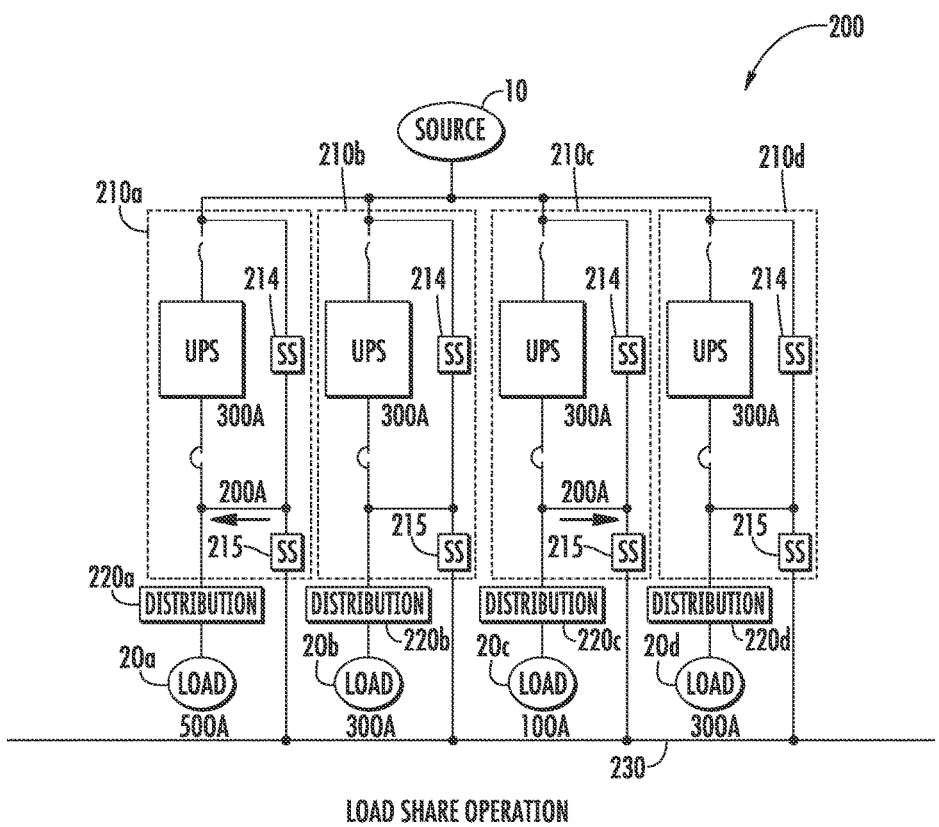
FIGS. 3-7 are schematic diagrams illustrating exemplary operations of the system of FIG. 2 according to further embodiments.
Figure 4:
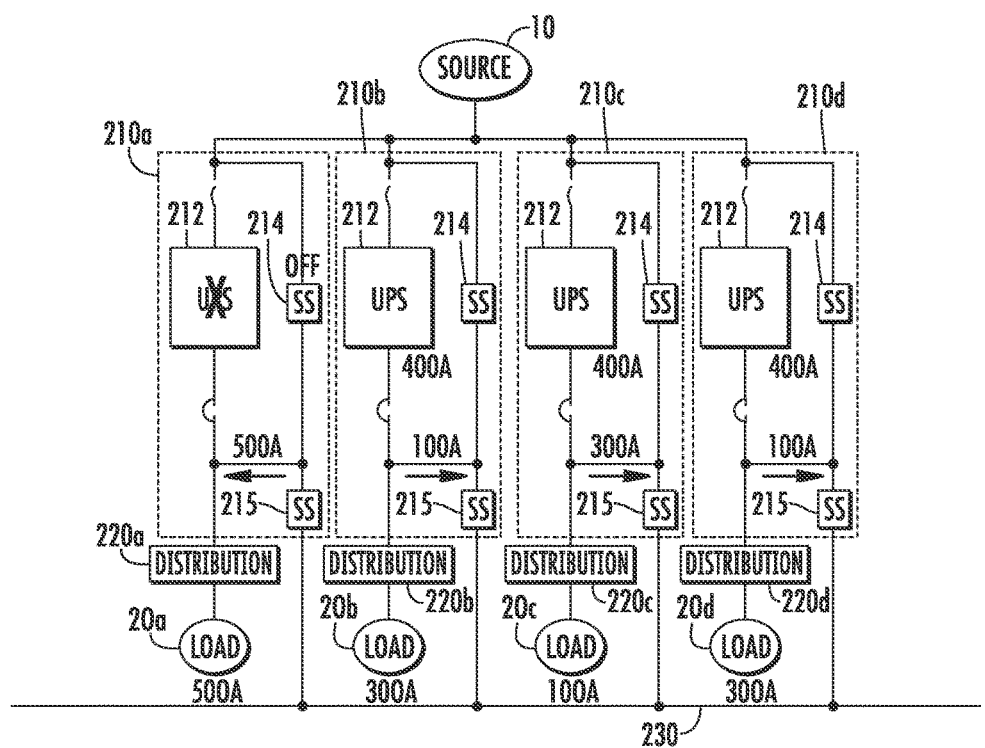

FIGS. 3-7 illustrate various operational modes that may be supported by the arrangement illustrated in FIG. 2. Referring to FIG. 3, the arrangement may support load sharing among the UPSs 112. In particular, FIG. 3 illustrates an exemplary distribution in which the second static switches 215 are closed, facilitating transfer of power from the third power supply unit 210c to the first power supply unit 210a via the static parallel bus 230 to allow the load 20a coupled to the first power supply unit 210a to receive power above the rated capacity of the UPS 212 of the first power supply unit 210a. As shown in FIG. 4, in the event of a failure of the UPS 212 of the first power supply unit 210a, additional power may be provided by the second power supply unit 210b and the fourth power supply unit 210d.

Figure 5:
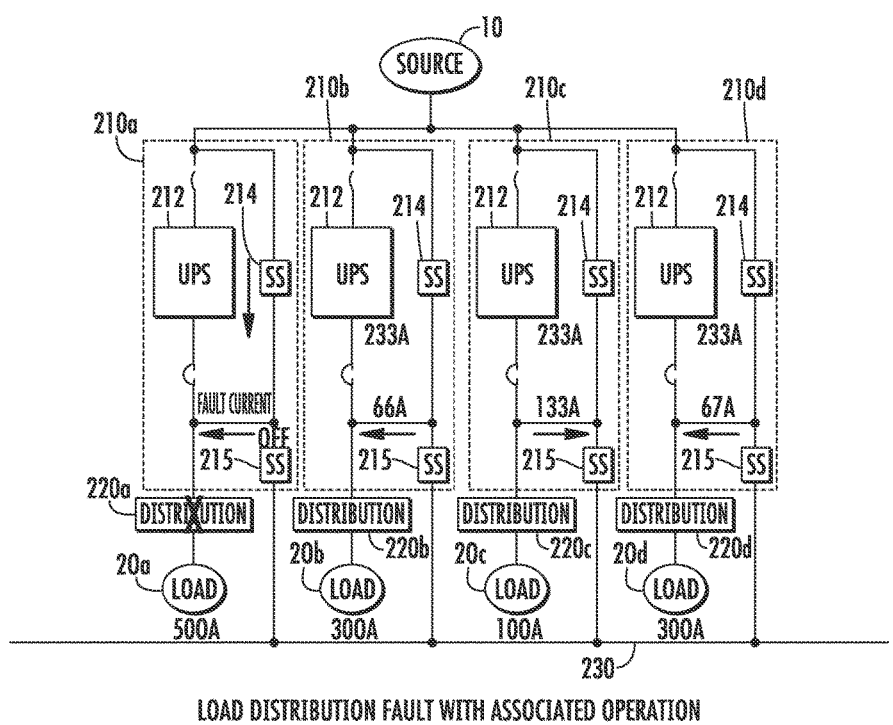
Figure 6:
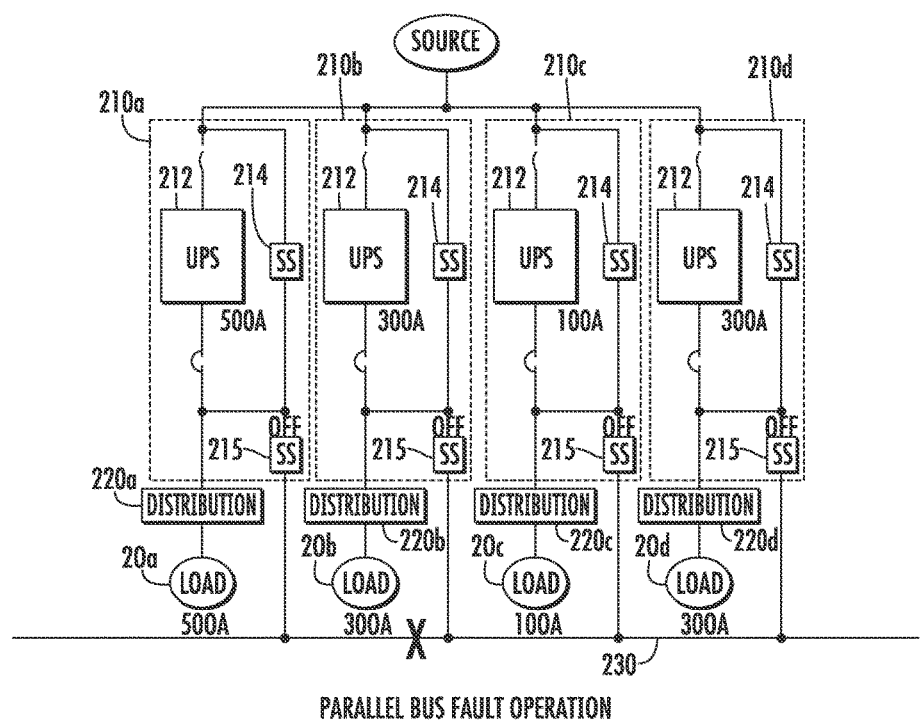
Figure 7:
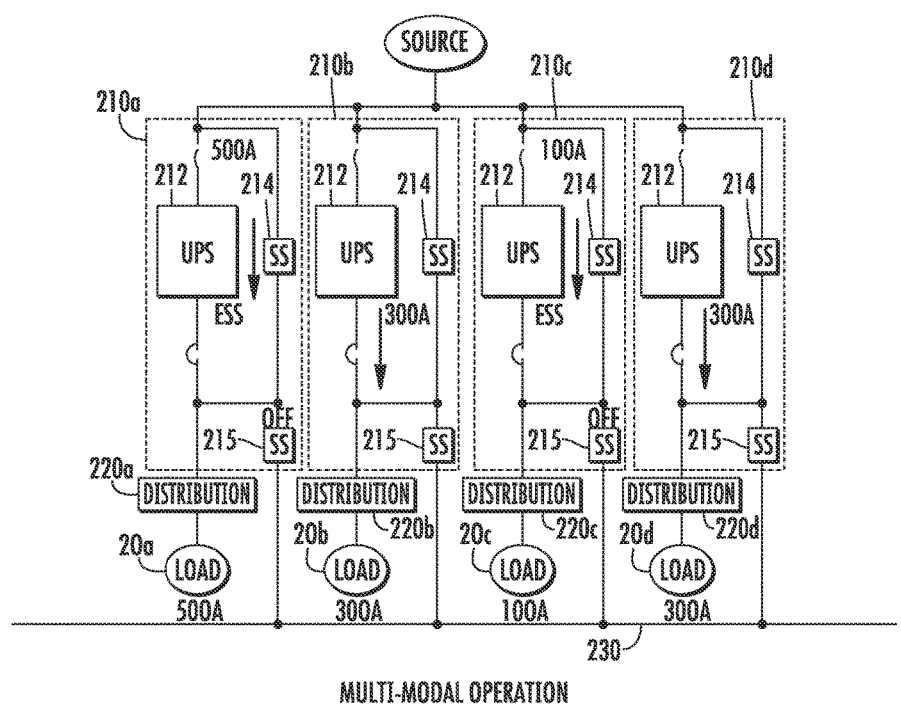

The arrangement illustrated in FIG. 2 may be also used to support effective clearing of faults on the distribution busses associated with the power supply units 210a, 210b, 210c, 210d. Referring to FIG. 5, for example, in the event of a fault on the first distribution bus 220a, the static switch 215 of the first power supply unit 210a may be turned off and the first static switch 214 of the first power supply unit 210 may be turned on to allow a fault clearing current to pass between the source 10 and the first power distribution bus 220a. This may allow a current level sufficient, for example, to cause tripping of a circuit interruption device coupled between the source 10 and the first power supply unit 210a. As the fault on the first distribution bus 220a is being cleared, the other power supply units 210b, 210c, 210d may continue to serve their respective loads 20b, 20c, 20d, and may engage in a power-sharing operation to achieve this result. Referring to FIG. 6, in the event of a fault on the parallel bus 230, the power supply units 210a, 210b, 210c, 210d may isolate the fault while continuing to serve their respective loads 20a, 20b, 20c, 20d by turning off their respective second switches 215 to isolate themselves from the paralleling bus 230.

The arrangement illustrated in FIG. 2 also enables multimode operations. For example, referring to FIG. 7, the power supply units 210a, 210b, 210c, 210d may support an energy saver system (ESS) mode in which the UPS 112 is bypassed by closing the first static switch 214, thus reducing losses associated with operation of the UPS 112. In this mode, the UPS 112 may be placed in a standby mode in which the UPS 112 may be transitioned quickly to an on-line (e.g., double conversion) mode upon detection of a degradation in input power quality. As illustrated, one or more of the power supply units 210a, 210b, 210c, 210d (e.g., the first and third power supply units 210a, 210c) may be operated in this ESS mode while others of the power supply units 210a, 210b, 210c, 210d (e.g., the second and fourth power supply units 210b, 210d) are concurrently operated in an online (e.g., double conversion) mode. The power supply units 210a, 210c operating in the ESS mode may, for example, serve loads 20a, 20c that are less critical than the loads 20b, 20d served by the power supply units 210b, 210d operating in the online mode.

According to some embodiments, system wide control schemes may be utilized to provide overarching monitoring and configuration management. Potential system features may include, for example:

1. Non-specific UPS sizing. In some embodiments, UPS of various capacities may be used in the various power supply units and share available current through the paralleling bus. In systems according to some embodiments of the inventive subject matter, unlike UPSs can be paralleled and individually controlled to not exceed their rated output limit. This loading determination could be done on an individual basis at the discrete UPS level.

2. The use of an Energy Saver System (ESS) mode. An ESS mode can be used for high efficiency operation. When the power supply units are all fed by the same utility feed, ESS can be deployed amongst all operating systems. ESS would supply load power from the utility (through the static switch bypass of each individual power supply unit), while running the associated UPS inverter in parallel with the utility in a low power state. The UPS may be configured to provide load current whenever the utility moves out of the prescribed voltage or frequency tolerance. Again, none, some or all of the power supply units can be connected through the parallel bus to achieve both redundancy and load sharing.

3. Multi-Operational Modes. Separate power supply units may operate in different operational modes. For example, a power supply unit (or group of power supply units) may be operating in an ESS mode (paralleled with the bypass utility source) while other power supply units may be operating in a traditional online (e.g., double conversion) mode. The power supply units may operate in a cohesive system allowing redundancy to be shared amongst all load segments.

4. "Self-Healing" Capability. In some embodiment, a system may re-configure itself to address when a power supply unit, or unit within the power supply unit, is in a failure condition. The system may re-route current through the paralleling bus to the affected load while simultaneously isolating the failed component of power supply unit for repair, all the while maintaining redundancy and/or operational integrity as it is defined by the systems design. In the event of a failure of the system based controller(s), the system may revert to single unit operation as a "fail safe" mode, even during a total loss of system control.

5. Load Balancing. Load balancing may be provided but is not required. Individual load balancing may be eschewed in favor of either groups of power supply units sharing or no load sharing at all while full redundancy support is in place. This unique operational feature allows each power supply unit to be treated in an individual manner, or in pre-determined groups or as one large group. All units across the entire system can be a member of the paralleling bus or not. Controlled via the individual static switches, power supply unit UPSs can be fluidly inserted or removed from the paralleling bus depending on need or performance. All remaining units may be rebalanced depending on the required mission for each power supply unit.

6. Generator Interface. Generators may be deployed at each power supply unit, or for multiple power supply units. The system control circuitry can send commands for the generators to start and supply load current, or to remove themselves from the bus and stand down. This allows coordination UPSs and generators for desired operational performance.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. A system comprising:
a plurality of power supply units having AC inputs coupled to an AC power source and AC outputs coupled to respective first busses, each of the power supply units comprising:
an uninterruptible power supply (UPS) having an output configured to be coupled to the AC output of the power supply unit;
a first switch configured to selectively couple the AC input to the AC output of the power supply unit; and
a second switch configured to selectively couple the AC output of the power supply unit to a second bus; and
at least one control circuit configured to close the first switch and open the second switch for one of the power supply units in the event of a fault on the first bus coupled to the AC output of the one of the power supply units to conduct a fault clearing current from the AC power source to the first bus coupled to the AC output of the one of the power supply units.

2. The system of claim 1, wherein the at least one control circuit is configured to control first and second ones of the power supply units to enable the first one of the power supply units to provide power to the first bus coupled to the second power supply unit from the first one of the power supply units via the second bus.

3. The system of claim 1, wherein the at least one control circuit is configured to detect a fault on the second bus and to responsively open all of the second switches of the power supply units.

4. The system of claim 1, wherein AC inputs of the power supply units are coupled in common to a power source.

5. The system of claim 1, wherein the at least one control circuit is configured to operate at least one of the power supply units in an energy saving mode wherein the first switches of the at least one of the plurality of power supply units is closed to bypass the UPS thereof.

6. The system of claim 1, wherein the at least one control circuit is configured to operate a first one of the power supply units in a first mode wherein the first switch of the first one of the power supply units is closed to bypass the UPS thereof and thereby provide power from the AC source to the first bus served by the first one of the power supply units while concurrently operating a second one of the power supply units in a second mode wherein the first switch of the second one of the power supply units is open and the UPS of the second one of the power supply units provides power to the first bus served by the second one of the power supply units.

7. A system comprising:
a plurality of power supply units having AC inputs coupled to an AC power source and AC outputs coupled to respective loads, each of the power supply units comprising:
an uninterruptible power supply (UPS) having an output configured to be coupled to the AC output of the power supply unit;
a first static switch configured to selectively couple the AC input to the AC output of the power supply unit; and
a second static switch configured to selectively couple the AC output of the power supply unit to a paralleling bus; and
at least one control circuit configured to close the first static switch of one of the power supply units and open the second static switch of the one of the power supply units to support conduction of a fault clearing current from the AC power source to a bus connected to the AC output of the one of the power supply units in the event of a fault on the bus.

8. The system of claim 7, wherein the at least one control circuit is configured to operate the first and second static switches of the power supply units to selectively transfer power between the power supply units and the loads via the paralleling bus.

9. The system of claim 7, wherein the at least one control circuit is configured to control first and second ones of the power supply units to enable the first one of the power supply units to provide power to the load coupled to the second power supply unit from the first one of the power supply units via the paralleling bus.

10. The system of claim 7, wherein the at least one control circuit is configured to detect a fault on the paralleling bus and to responsively open all of the second static switches of the power supply units.

11. The system of claim 7, wherein the at least one control circuit is configured to operate at least one of the power supply units in an energy saving mode wherein the first static switch of the at least one of the power supply units is closed to bypass the UPS thereof.

12. The system of claim 11, wherein the at least one control circuit is configured to open the first static switch of the at least one of the power supply units and initiate provision of power from the UPS thereof in response to a condition of the AC power source.

13. The system of claim 7, wherein the at least one control circuit is configured to operate a first one of the power supply units in a first mode wherein the first static switch of the first one of the power supply units is closed to bypass the UPS thereof and provide power to the load coupled to the first one of the power supply units from the AC power source while concurrently operating a second one of the power supply units in a second mode wherein the first static switch of the second one of the power supply units is open and the UPS of the second one of the power supply units is providing power to a load coupled to the load coupled to the second one of the power supply units.

14. A system comprising:
a first UPS having an output configured to be coupled to a first load;
a second UPS having an output configured to be coupled to a second load;

a first switch configured to selectively couple an AC power source to the first load to bypass the first UPS;
a second switch configured to selectively couple the first load to a paralleling bus;
a third switch configured to selectively couple the AC power source to the second load to bypass the second UPS;
a fourth switch configured to selectively couple the second load to the paralleling bus; and
at least one control circuit configured to maintain the first switch in a closed state and the second switch in an open state to bypass the first UPS and provide power to the first load directly from the AC power source while isolating the first UPS from the paralleling bus and to concurrently maintain the third switch in an open state and operate the second UPS in an on-line mode to provide power to the second load.

15. The system of claim 14, wherein the at least one control circuit is configured to control the first, second, third and fourth switches to selectively transfer power to the first and second loads via the paralleling bus.

16. The system of claim 14, wherein the at least one control circuit is configured to control the first and second UPSs and the first, second, third and fourth switches to enable the first UPS to provide power to the second load via the paralleling bus.

17. The system of claim 14, wherein the at least one control circuit is further configured to detect a fault condition for the first load and to responsively close the first switch and open the second switch to support clearance of the fault.

18. The system of claim 14, wherein the at least one control circuit is configured to detect a fault on the paralleling bus and to responsively open the second and fourth switches.

* * * * *